(12) United States Patent
Takakura et al.

(10) Patent No.: US 6,175,786 B1
(45) Date of Patent: Jan. 16, 2001

(54) VEHICLE DIAGNOSING APPARATUS

(75) Inventors: Keiji Takakura, Saitama-ken; Hiroyuki Aiba, Tochigi-ken, both of (JP)

(73) Assignee: Honda Giken Kogyo Kabushiki Kaisha, Tokyo (JP)

(*) Notice: Under 35 U.S.C. 154(b), the term of this patent shall be extended for 0 days.

(21) Appl. No.: 09/120,227

(22) Filed: Jul. 22, 1998

(30) Foreign Application Priority Data

Jul. 24, 1997 (JP) .................................................. 9-198707
Mar. 30, 1998 (JP) ................................................ 10-084485

(51) Int. Cl.[7] ........................... G06F 17/00; G01M 17/00
(52) U.S. Cl. ................................ 701/29; 701/33; 702/123
(58) Field of Search .................................. 701/29, 30, 33, 701/35; 702/123, 119, 183, 185; 73/117.3

(56) References Cited

U.S. PATENT DOCUMENTS

| 5,005,129 | * | 4/1991 | Abe et al. | 701/29 |
| 5,072,391 | * | 12/1991 | Abe | 701/29 |
| 5,467,277 | * | 11/1995 | Fujisawa et al. | 701/102 |
| 5,506,773 | * | 4/1996 | Takaba et al. | |
| 5,774,361 | * | 6/1998 | Coarelli, III et al. | 701/29 |
| 6,006,146 | * | 12/1999 | Usui et al. | 701/29 |

FOREIGN PATENT DOCUMENTS 2076188   4/1981 (GB).

* cited by examiner

Primary Examiner—Tan Nguyen
(74) Attorney, Agent, or Firm—Armstrong, Westerman, Hattori, McLeland & Naughton (57) ABSTRACT

A vehicle diagnosing apparatus diagnoses a vehicle by being connected to an electronic control unit which is mounted on the vehicle and by receiving data, via the electronic control unit, from various sensors mounted on the vehicle. The judging result of each judging step of the diagnosing program can be arbitrarily set. The diagnosing program is then performed according to the judging result set for each of the judging steps. While the diagnosing is being performed, there is indicated the screen under performance in which the setting conditions such as judging result, etc. is displayed (S1). With the progress of the performance of the diagnosing program, the order of performance N of the steps is indicated (S7).

4 Claims, 7 Drawing Sheets

VEHICLE DIAGNOSING APPARATUS

BACKGROUND OF THE INVENTION

1. Field of the Invention

The present invention relates to a vehicle diagnosing apparatus for diagnosing a vehicle such as a motor vehicle. The diagnosing apparatus is connected to an electronic control unit to be mounted on the vehicle and incorporates or receives data, via the electronic control unit, from various sensors which are mounted on the vehicle.

2. Description of the Related Art

As a method of inspecting a logic of a diagnosing program of this kind of diagnosing apparatus, there is known the following. Namely, a vehicle whose diagnosing has already been finished is diagnosed by means of a diagnosing apparatus which performs diagnosing according to a diagnosing program for an object to be inspected. It is thus checked whether each of the diagnosing items is diagnosed in a predetermined order, and whether the result that is the same as the known result can be obtained. An inspection is thereby made whether the logic of the diagnosing program is normal or not.

In the diagnosing program, the succeeding processing is defined depending on the judging results and, therefore, varies from result to result. Accordingly, in order to inspect the logic of all portions of the diagnosing program in the conventional method, it is necessary to prepare several vehicles so that all kinds of judging results can be obtained for each of the judging items and then subject each of the vehicles to actual diagnosing. In case the judging items are large in number, a large number of vehicles must be diagnosed. This, however, requires a long time in inspection and is practically difficult. Especially, since most of the vehicles are normal, there is little or no chance of checking the processing of a diagnosing apparatus after it has been judged to be "abnormal." It is thus difficult to inspect to see whether the logic of this portion is normal or not.

If a special electronic control apparatus for inspection is prepared so that all kinds of judging results can be obtained, it will be possible to perform a complete inspection in a short period of time. However, this kind of apparatus prepared exclusively for such an inspection is complicated in construction. Further, the apparatus becomes needless once the inspection is finished. It is therefore not advisable to use this kind of specially prepared apparatus.

The present invention has an object of providing a vehicle diagnosing apparatus in which it is not necessary to prepare a vehicle or an electronic control apparatus as an apparatus to be diagnosed when the logic of the diagnosing program is inspected and in which there is provided a function of inspecting a logic of a diagnosing program surely at a short period of time.

SUMMARY OF THE INVENTION

In order to attain the above and other objects, the present invention is a vehicle diagnosing apparatus which diagnoses a vehicle by being connected to an electronic control unit mounted on the vehicle and by receiving data from various sensors mounted on the vehicle via the electronic control unit, the apparatus comprising: diagnosing result setting means for arbitrarily setting a judging result of each judging step in a diagnosing program; switching means for switching a performance mode of the diagnosing program between a diagnosing mode for performing the diagnosing program as it is and an inspection mode for inspecting the logic of the diagnosing program by performing the diagnosing program according to the judging result which is set by the diagnosing result setting means for each of the judging steps; and indicating means for indicating, when performing the diagnosing program in the inspection mode, the order of performing the steps which constitute the diagnosing program and a judging result which is set by the diagnosing result setting means.

When the diagnosing program is performed in the inspection mode, the judging result set by the diagnosing result setting means for each of the judging steps is performed as if it were obtained by a judging processing at each of the judging steps. Therefore, the logic of the diagnosing program can be seen from the order of the steps performed at this time. By simply changing the setting of the judging results and the combination of the judging results of each of the judging items, all cases can be coped with and therefore the logic of all portions of the diagnosing programs can be inspected. Further, since the judging results are set, the judging steps are not performed in the inspection mode. Therefore, as compared with the case in which the signals to be transmitted from the electronic control unit are judged, the time for inspection can be shortened.

Preferably, the vehicle diagnosing apparatus further comprises pausing condition setting means for setting a pausing condition which pauses, at a completion of a predetermined step, the diagnosing program under performance in the inspection mode, and the pausing condition is indicated in the indicating means when the diagnosing program is performed in the inspection mode. Then, the order of performing can be sequentially confirmed for each of the sections segmented by pausing. Therefore, it is easier to find out the portions in trouble as compared with the case in which the whole is confirmed when the performance of all the steps has been completed.

When a result is obtained to the effect that the logic is normal by performing the diagnosing program in the inspection mode according to the set judging results, it means that the recognition has been made of all of those steps which are performed in case where the same judging results are obtained by performing the diagnosing program in the diagnosing mode. Therefore, preferably the vehicle diagnosing apparatus further comprises processing time setting means for setting the processing time required to perform each of the steps which constitute the diagnosing program, and computing means which computes the diagnosing time required for performing the diagnosing program in the diagnosing mode, the computing being made by summing the processing time in each of the steps performed when the diagnosing program is performed in the inspection mode. Then, it is useful in determining the tact time which is required in performing the diagnosing of the vehicle as one step in a plurality of steps.

In the embodiment to be described hereinbelow, the judging result setting means, the pausing condition setting means, processing time setting means and switching means are constituted by a keyboard 25. The computing means is constituted by a central processing unit (CPU). The indicating means is constituted by a display 24.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
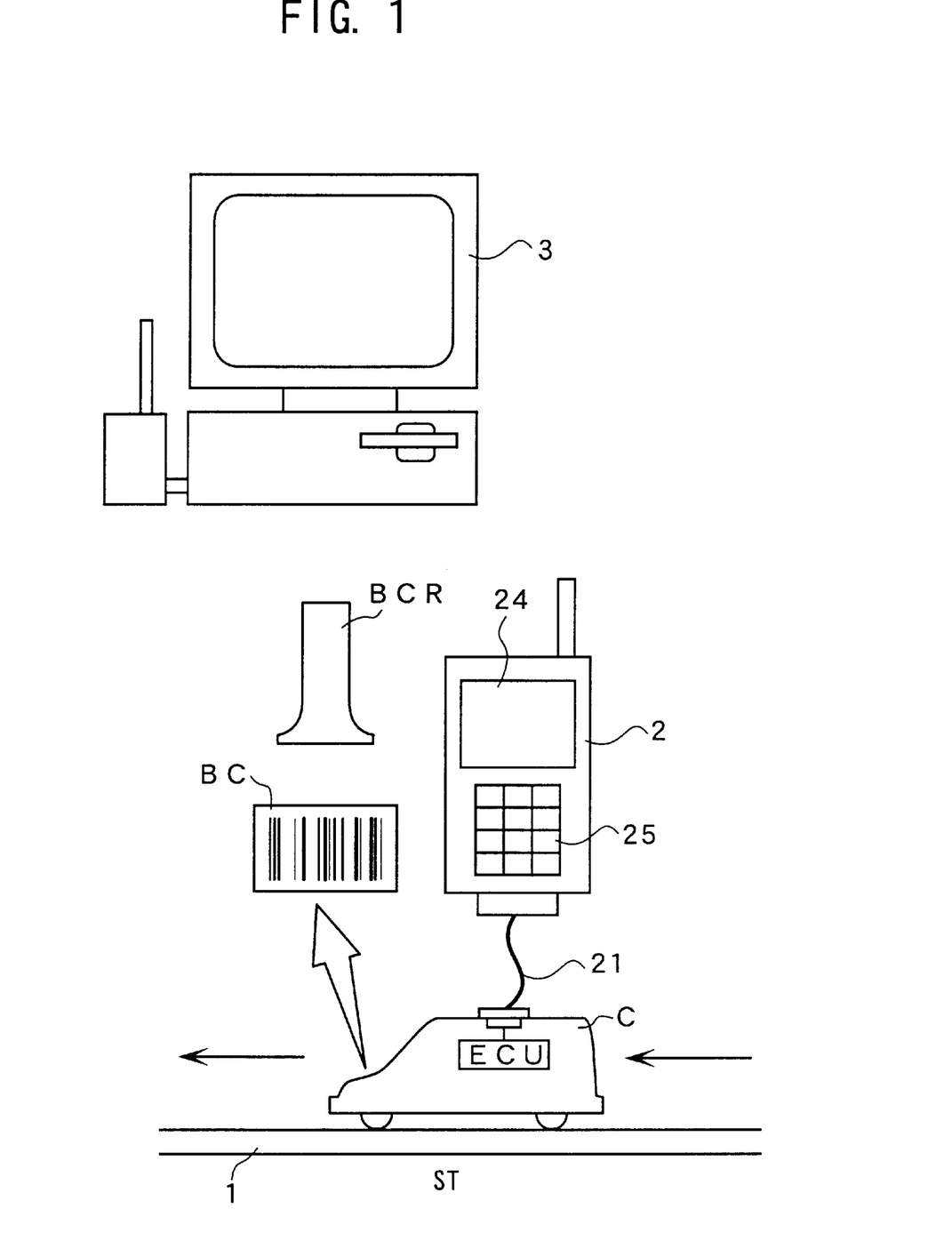
FIG. 1 is a schematic diagram to show a diagnosing installation which is provided with the diagnosing apparatus of the present invention.
Figure 2:
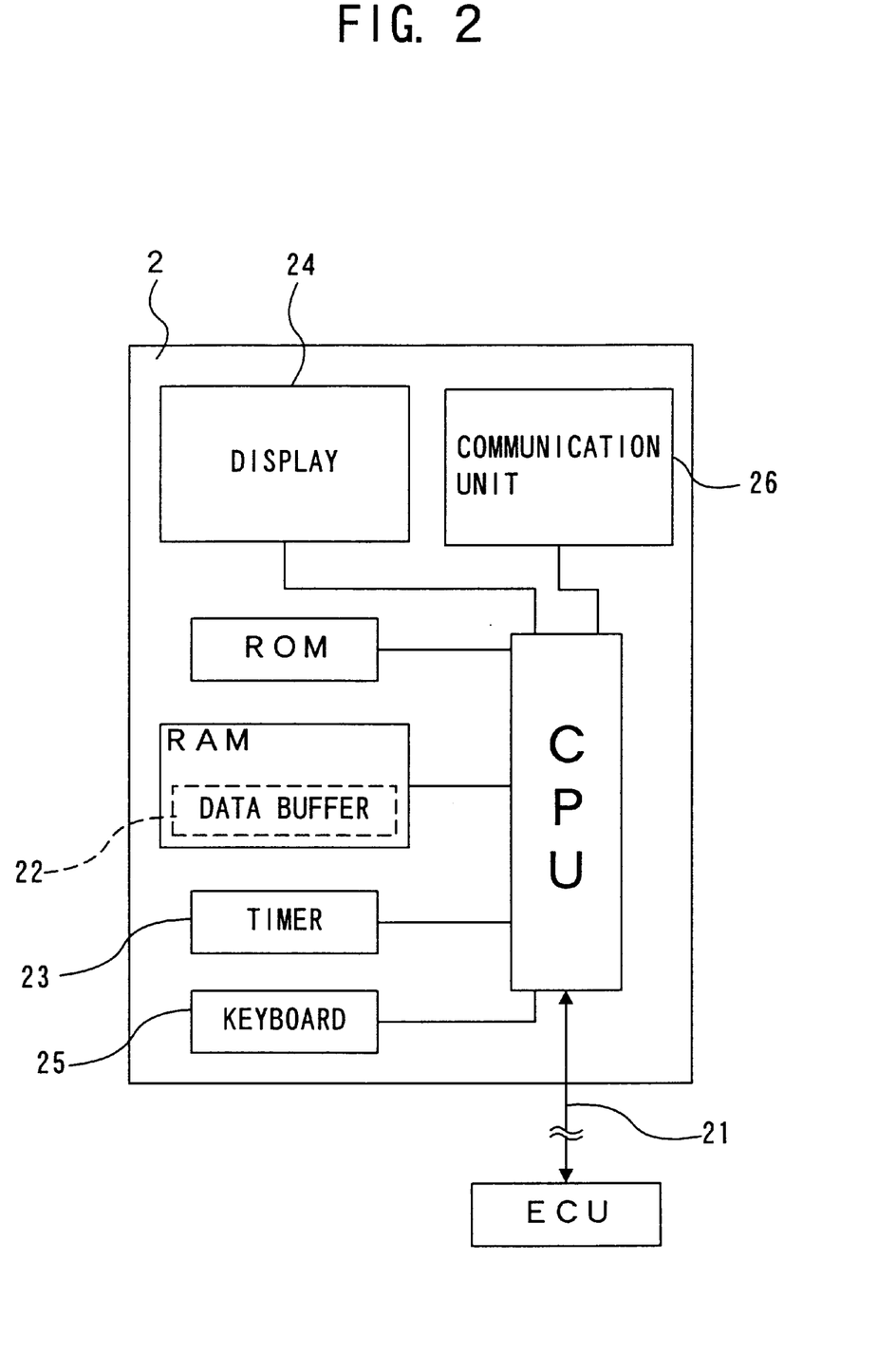
FIG. 2 is a block diagram to show an arrangement of the diagnosing apparatus.

With reference to FIG. 1, reference numeral 1 denotes a vehicle diagnosing line on which a vehicle C to be diagnosed is transported. The vehicle C on which is mounted an electronic control unit (ECU) is sequentially transported at a predetermined frequency. The vehicle C has attached thereto a bar code BC which indicates a vehicle number peculiar to the vehicle. The vehicle number is read by a bar code reader BCR. Reference numeral 2 denotes a portable type of diagnosing apparatus which can be connected to the ECU of the vehicle C via a cable 21. With reference to FIG. 2, the diagnosing apparatus 2 is provided with: a central processing unit (CPU); a read-only memory (ROM); a random-access memory (RAM) which stores a diagnosing program and which also functions as a data buffer 22 for storing therein data such as data signals, or the like, read from the ECU via the cable 21; a timer 23 which measures the diagnosing time when the vehicle C is diagnosed by performing the diagnosing program; a display (e.g., liquid crystal display, LCD) 24 which displays or indicates the data stored in the data buffer 22; and a keyboard 25 which serves as a setting means for setting the judging results, or the like. The setting means may be other than a keyboard; it may be constituted by a mouse or a touch panel or a combination of the above. Further, the above-described ROM and the RAM may also be constituted by other recording medium such as a hard disc, or the like.

The diagnosing apparatus 2 is further provided with a communication unit 26 which transmits the data signals, or the like, which are stored in the data buffer 22. It performs a bidirectional wireless communication to and from a host computer 3 which is disposed near the vehicle diagnosing line 1. When the host computer 3 receives the data from the diagnosing apparatus 2, it records them together with the other data such as the vehicle number, or the like, which have been transmitted from the bar code reader BCR.

The diagnosing apparatus 2 of this embodiment is provided, as a mode for performing the diagnosing program, with an "inspection mode" aside from a "diagnosing mode" which diagnoses the ECU by performing the diagnosing program as it is. The diagnosing apparatus 2 performs the switching and selection of the modes by operating the keyboard 25 as described hereinbelow. The "inspection mode" is not intended to issue the judging results regarding the judging items by processing the data transmitted from the ECU according to each of the judging steps. Instead, it is intended to perform the diagnosing program on condition that the judging results set in advance by the keyboard 25 for each of the judging steps are the judging results in each of the judging steps. Inspection is thus made whether the logic of the diagnosing program is normal or not depending on whether the order of performing the steps at this time is correct or not.

An explanation will now be made about the "inspection mode" with reference to FIGS. 3 through 6. When the "inspection mode" has been selected in the menu screen (not illustrated) by the operation of the keyboard 25, the inspection mode is selected as the performing mode of the diagnosing apparatus. As a result, a setting screen G1 for the inspection mode will be indicated on the display 24 (see FIG. 3).

Figure 3:
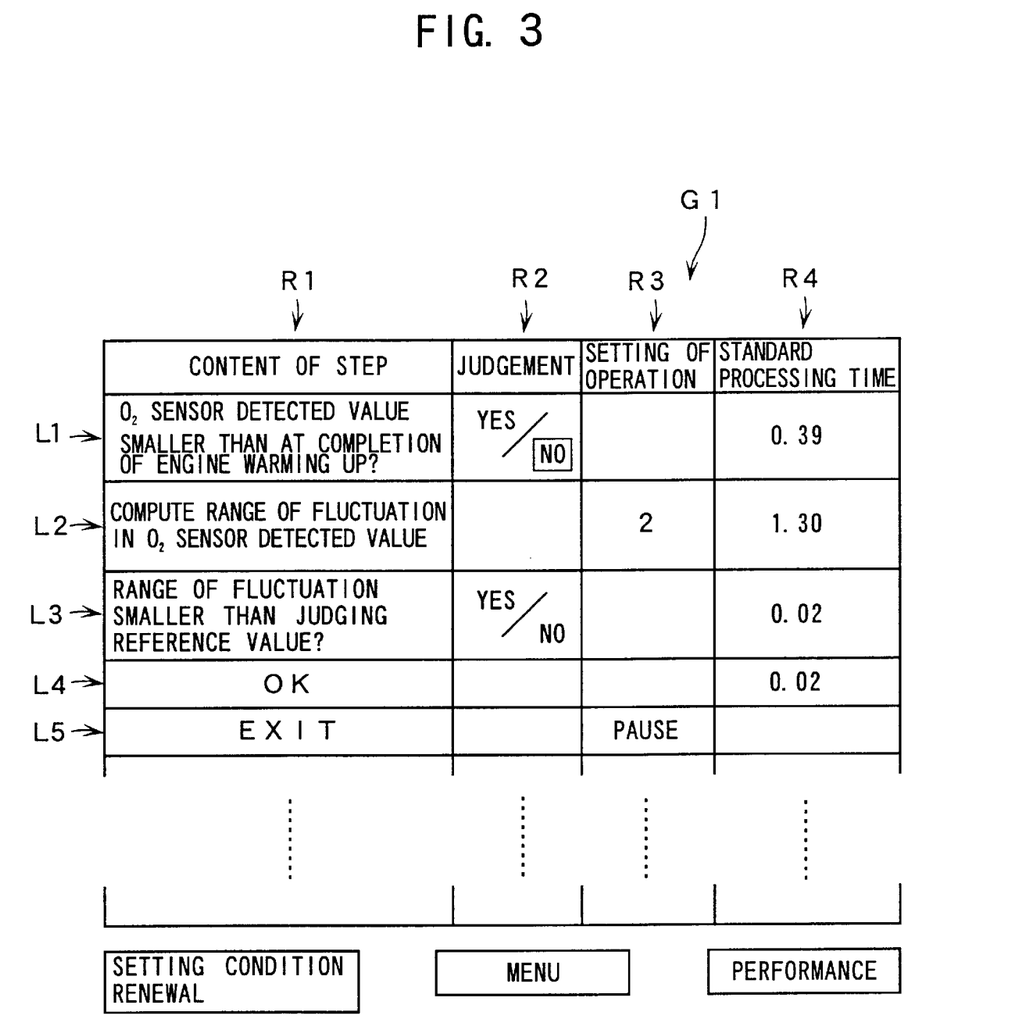
FIG. 3 is a diagram to show the setting screen in the inspection mode.
Figure 7:
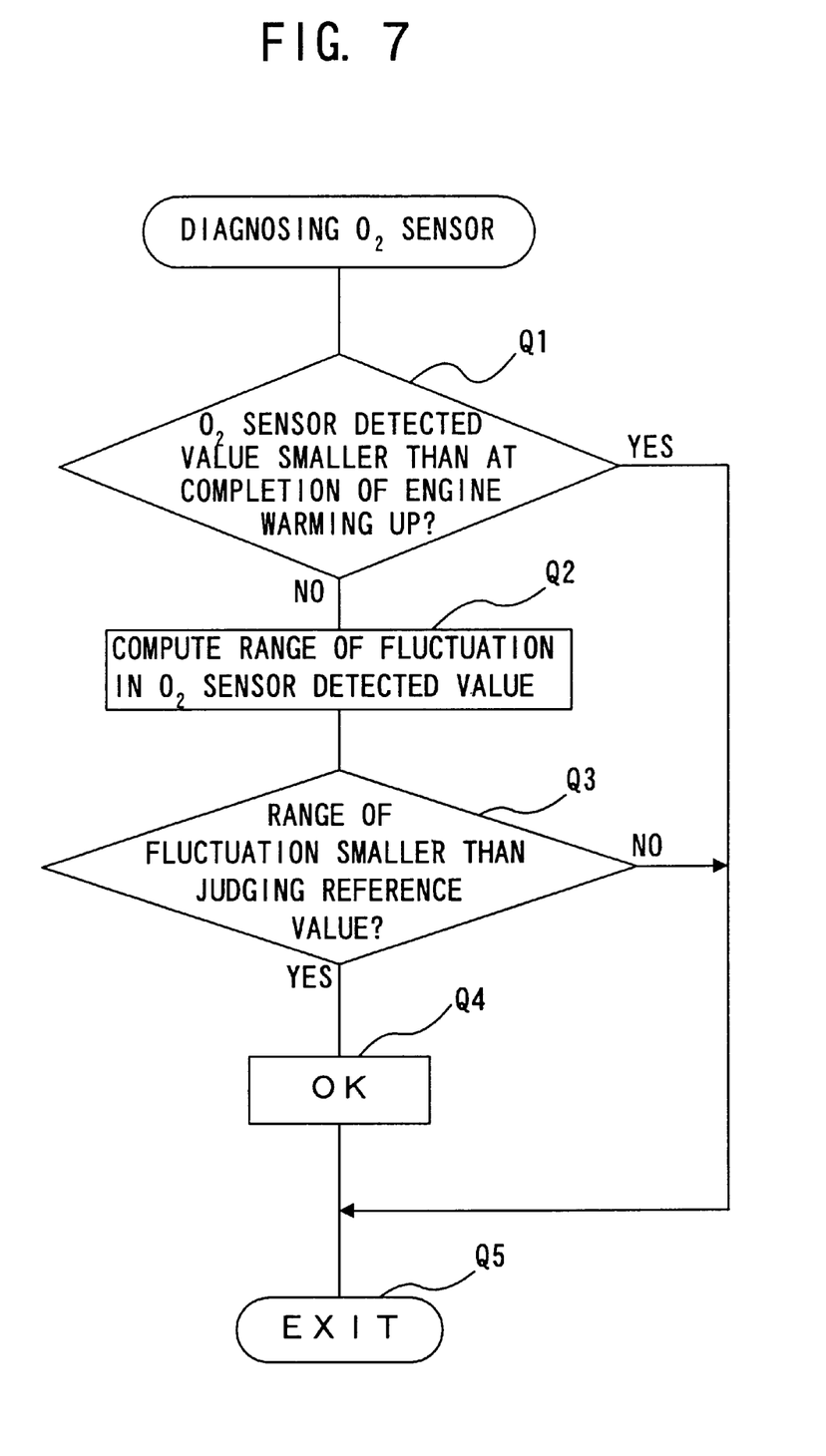
FIG. 7 is a flow chart to show the diagnosing program.

FIG. 3 shows a part of the setting screen which corresponds to the diagnosing sub-routine, included in the diagnosing program, for an $O_2$ sensor (a sensor for detecting the oxygen concentration in the exhaust gases from the engine). The contents of the sub-routine for diagnosing the $O_2$ sensor are shown in FIG. 7. A discrimination is made as to whether the value detected by the $O_2$ sensor is smaller than the value which is detected at the time of completion of warming up of the engine (Q1). If the former is larger than the latter, the width or range of fluctuation in the value detected by the $O_2$ sensor is obtained (Q2). A judgement is made as to whether this range of fluctuation is smaller than a judging reference value or not (Q3). If the range of fluctuation is smaller, an acceptance flag is erected or raised based on a judgement that the $O_2$ sensor is acceptable (Q4). If the value detected by the $O_2$ sensor is smaller than that at the time of completion of warming up of the engine or if the range of fluctuation is larger than the judging reference value, the flag is not erected but the sub-routine for diagnosing the $O_2$ sensor is finished to thereby move to the next sub-routine (Q5).

The setting screen G1 is a screen in which the judging results, or the like, in each of the judging steps such as Q1 and Q3 are set in advance. On each line at the left end first column R1 on the setting screen G1, there are indicated the content (name or description) of each step. The second column R2 from the left is a column for selectively setting the judging results in the judging steps, and is indicated therein in advance choices (YES/NO) of the judging results. The third column R3 from the left is a column in which a setting is made of a computed value to be computed in a predetermined step, and in which operating conditions such as a condition for temporarily stopping (or pausing) the diagnosing program which is being performed in the inspection mode are set. The fourth column R4 from the left is a column in which a standard processing time for each step is inputted and set. In case all of the steps cannot be displayed at one time, the screen can be scrolled, for example, in order to indicate a predetermined step.

When the setting screen G1 is indicated, setting of conditions is made by moving a cursor to appear on the screen within predetermined windows from the second column R2 through the fourth column R4. It is so arranged that the set conditions are stored in the RAM. If the conditions have already been stored, the stored setting conditions will be indicated as soon as the setting screen G1 is indicated. Therefore, change is made only to the setting conditions that must be changed.

In case the setting is made in the second column R2, the cursor is moved to a window on a predetermined line of the second column R2. The setting is then made by selecting either "YES" or "NO" by the cursor. FIG. 3 shows a condition in which a setting of "NO" has been made in the judging result of the first line L1 which corresponds to the step Q1 in the diagnosing program. In the window of the third column R3 and the fourth column R4, it is possible to input numerical values by means of the keyboard 25. Depending on the necessity, computed values are inputted into the third column R3, and standard processing times are inputted into the fourth column R4. FIG. 3 shows a condition in which "2" has been set in the third column R3 which corresponds to the step Q2 in the diagnosing program, as the range of fluctuation in the value detected by the $O_2$ sensor. The value "2" is larger than the reference judging value to be used in the judgement in the step Q3. Therefore, the result of judgement in the step Q3 is indirectly set to "NO." Instead of setting the range of fluctuation in the value detected by the $O_2$ sensor in the third column R3 on the second line L2, either "YES" or "NO" may be selected in the second column R2 on the third line L3 which corresponds to step Q3. If a pause setting key is pushed in a condition in which the cursor is indicated inside the window of the third column R3, the pause condition is set and "pause" is indicated in the window.

Once the selection and inputting of the conditions have been finished, "setting condition renewal" which is indicated on a lower portion of the setting screen G1 is selected. The setting condition which is to be stored in the RAM is renewed to the setting condition to be indicated on the display 24. If the "menu" on the lower portion of the screen is selected, the screen can be returned to the menu screen, whereby the diagnosing mode can be selected.

When the "performance" on the lower portion of the screen G1 is selected, the diagnosing program is performed in the inspection mode according to the setting conditions to be indicated on the setting screen G1.

Figure 4:
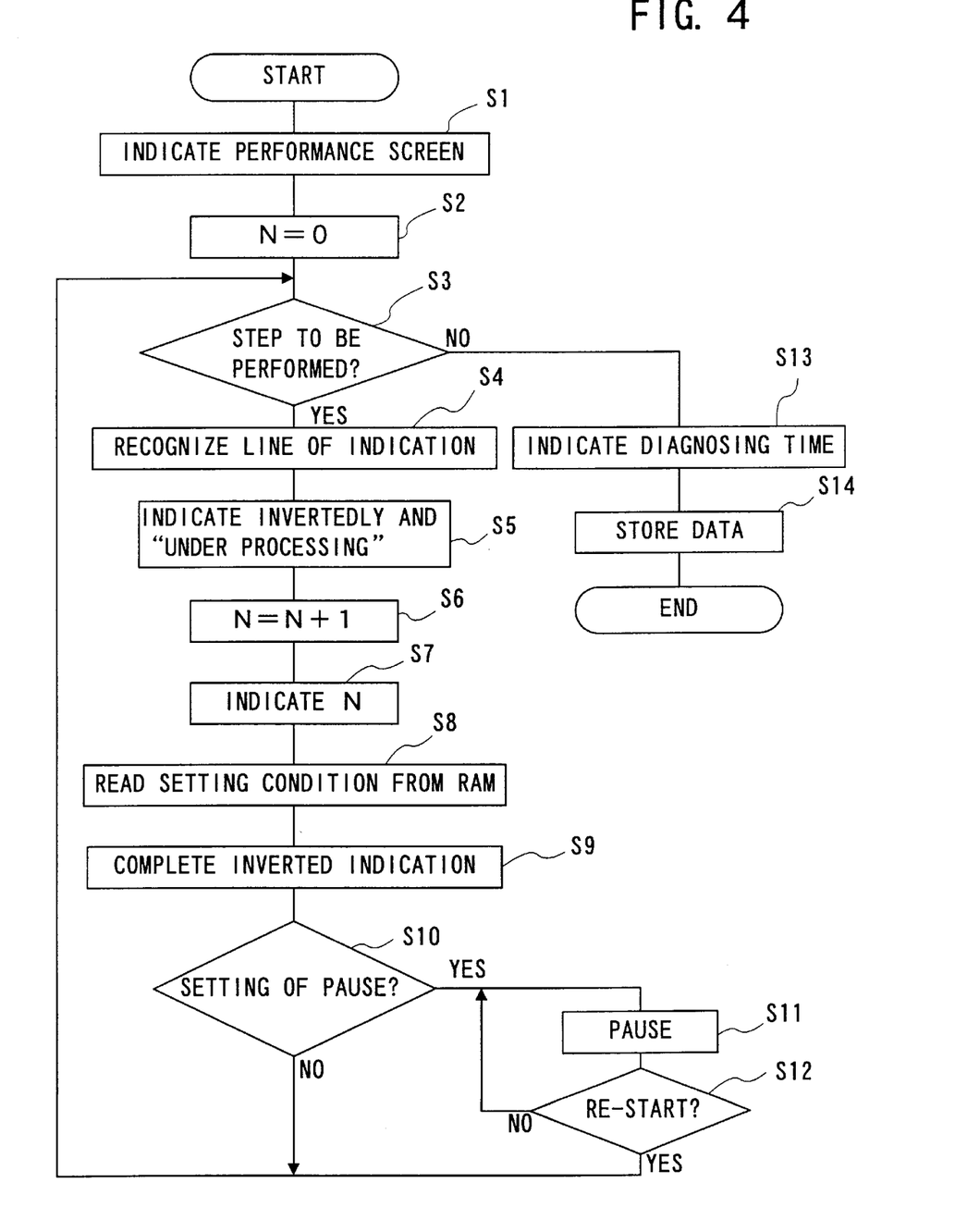
FIG. 4 is a flow chart to show the flow of processing relating to the performance screen in the inspection mode.

An explanation will now be made about the operation of the diagnosing apparatus with an emphasis mainly placed on the processing of the indicating on the display 24 during the performance of the diagnosing program with reference to the flow chart shown in FIG. 4.

Figure 5:
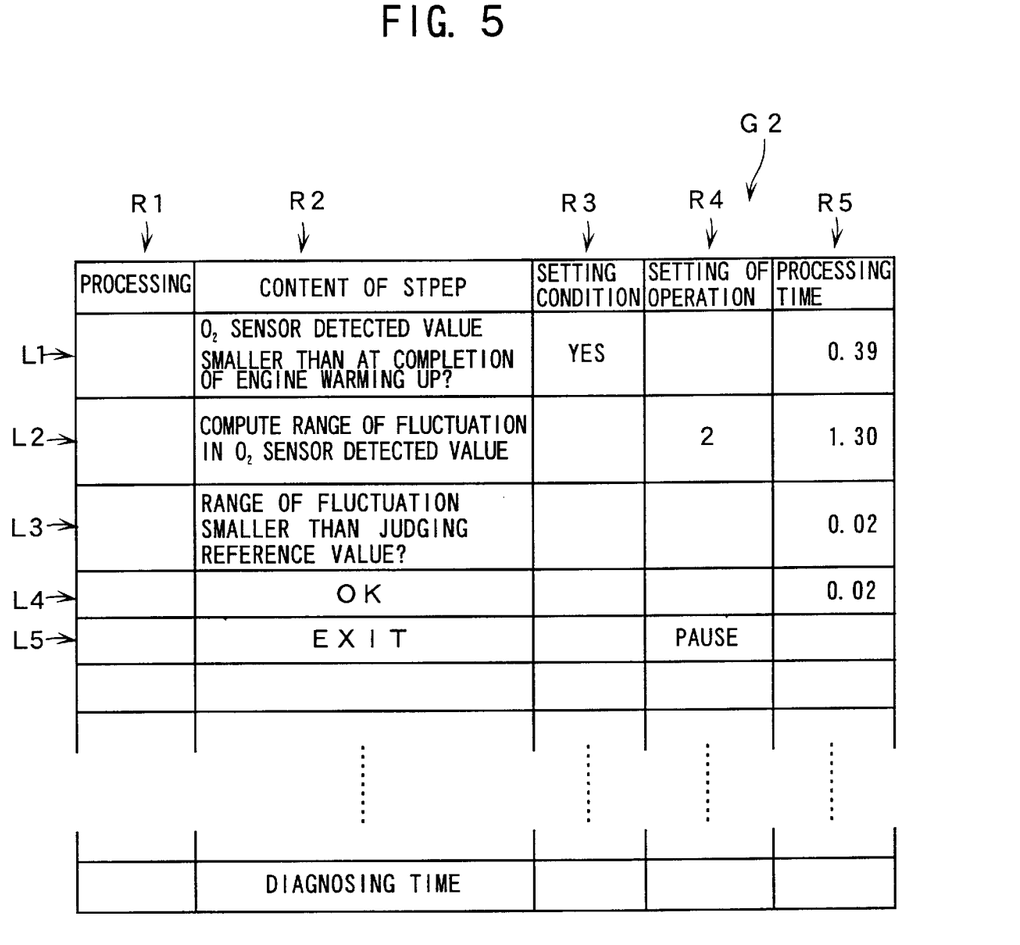
FIG. 5 is a diagram to show an initial state of performance screen in the inspection mode.

When the "performance" on the lower portion of the setting screen G1 is selected, or a command of performance in the inspection mode is given on the menu screen, the performance screen G2 which is illustrated in FIG. 5 is indicated on the display 24 (S1).

The first column R1 on the performance screen G2 is a column to show the order in which each of the steps has been performed. With the progress in the performance of the diagnosing program, the order thereof is sequentially indicated (see FIG. 6). The second column R2 is a column to show the contents of each of the steps. From the third column R3 through the fifth column R5, there are indicated the setting conditions which are stored in the RAM. In other words, the third column R3 indicates the judging results (YES or NO), the fourth column R4 indicates the computed values or the "pause" condition, and the fifth column R5 indicates the standard processing time.

Thereafter, the number N to show the order of processing is initialized (S2). Then, a recognition is made of the step to be performed first if it is the first time. Subsequently, if a step to be performed next is given at the end of the previous step (S3), a recognition is made as to on which line of the performance screen G2 that particular step is indicated (S4). The line in question is invertedly indicated and an indication of "under performance" is made on the third column R3 (S5, see FIG. 6). Further, "1" is added to the number N (S6) and the number N is indicated on the invertedly indicated first column R1 (S7). According to these operations, the step under performance as well as the order of performance can be recognized at a glance, and a checking can be made on the spot whether the logic relating to the branching conditions in the diagnosing program is normal or not. For example, if the judging result has been set to "NO" in step Q1 as illustrated, the number N on the second line L2 should become "2" as long as the logic of the diagnosing program is normal. Therefore, when the number "N" on the other lines becomes "2", a discrimination can be made that the diagnosing program is abnormal. Further, if the range of fluctuation in the value detected by the $O_2$ sensor is set to "2" which is larger than the judging reference value, the numbers in the second line L2, third line L3, and the fifth line L5 should become "2", "3", "4", respectively. Therefore, if the number N on the fourth line L4 becomes "4", a discrimination can be made that the judging step of Q3 is abnormal. Once the number N has been indicated as explained above, the corresponding setting condition is read from the RAM (S8), and the inverted indication is completed (S9).

Thereafter, if there is a "pause" condition in the corresponding step (S10), the performance of the diagnosing program is temporarily paused (S11). If the processing of the diagnosing program is performed by dividing it into several segments by the pausing, the order in which the steps are performed in each segment can be checked. Therefore, the locating of the portion in trouble can sometimes be made easier as compared with the case in which analysis is made over the entire portion after the completion of the performance.

On the other hand, if there is no "pause" condition (S10), or when the diagnosing program is re-started as a result of releasing the "pause" by the operation of the keyboard 25 (S12), the program returns to step S3, and the same process as explained hereinabove is repeated. It may also be so arranged that the program is re-started at a lapse of a predetermined pausing time.

Then, if there is no command about the step to be performed next (S3), summing is made by the CPU only of the processing times which are indicated on the fifth column R5 on the lines in which the numbers of performing order are given on the first column R1. The diagnosing time which would be required if the same steps were performed in the diagnosing mode is computed and indicated on the lowest line (S13). Finally, the obtained data such as the order of the steps, the computed diagnosing times, or the like, are stored in the RAM (S14), and the performance of the diagnosing program is finished. The storing of the data may also be made each time the respective data are obtained.

Figure 6:
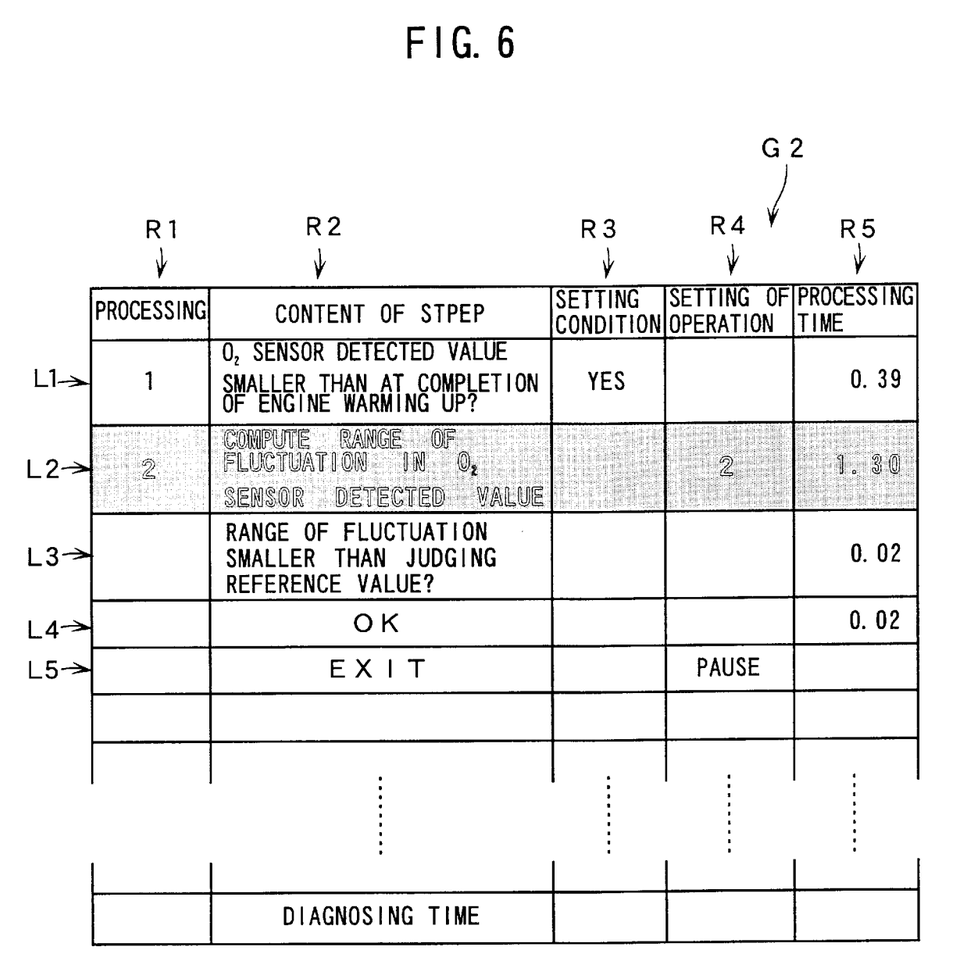
FIG. 6 is a diagram to show the state of performing of the performance screen in the inspection mode.

According to this embodiment, a checking can be made instantly from the order of performing the steps to be indicated on the performance screen G2 whether the logic is normal or not. It is also possible to judge whether the logic is normal or not by analyzing the stored data after the inspection has been completed.

The computed diagnosing time is the standard diagnosing time when the same judging results as are set is obtained when the diagnosing program is performed in the diagnosing mode. Therefore, if the logic is inspected by performing the diagnosing program under various set conditions, it can be known in what combination of the judging results the diagnosing time becomes longer and in what combination it becomes shorter. Also, the standard time can be known in case where a longer time is required and where a shorter time is required, respectively. It is therefore useful in determining the tact time which is required in performing the diagnosing of the vehicle as one step in a plurality of steps.

In the above-described embodiment, an explanation was made about a case in which the setting condition such as the judging results, or the like, are selected and inputted by an operator. However, the following is also possible. Namely, the conditions other than pausing are automatically set in sequence to thereby perform the diagnosing program in the inspection mode. The inspection of the logic is thus automatically performed for all of the combination patterns of the setting conditions. Or else, the inspection of the logic is similarly performed by limiting the setting conditions which are automatically set in sequence to the necessary minimum. In this manner, whether the logic of the entire diagnosing program is normal or not can be quickly and surely checked, whereby a high inspection quality can be obtained.

In this embodiment, the entire diagnosing program is inspected at a time. However, in case the diagnosing items are large in number, the diagnosing program may be divided into some blocks so that the block to be inspected can be selected. In this arrangement, only the necessary block can be inspected when a re-examination is made, whereby the working efficiency from the viewpoint of time can be improved.

As explained hereinabove, at the time of inspection of the logic in the diagnosing program of a diagnosing apparatus, an electronic control apparatus need not be prepared as an apparatus to be diagnosed. In addition, the logic of the diagnosing program can be surely inspected in a short period of time.

It is readily apparent that the above-described vehicle diagnosing apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A vehicle diagnosing apparatus which diagnoses a vehicle by being connected to an electronic control unit mounted on the vehicle and by receiving data from various sensors mounted on the vehicle via the electronic control unit, said apparatus comprising:

diagnosing result setting means for arbitrarily setting a judging result of each judging step in a diagnosing program;

switching means for switching a performance mode of the diagnosing program between a diagnosing mode for performing the diagnosing program as it is and an inspection mode for inspecting the logic of the diagnosing program by performing the diagnosing program according to the judging result which is set by said diagnosing result setting means for each of the judging steps; and indicating means for indicating, when performing the diagnosing program in the inspection mode, the order of performing the steps which constitute the diagnosing program and a judging result which is set by said diagnosing result setting means.

2. A vehicle diagnosing apparatus according to claim 1, further comprising pausing condition setting means for setting a pausing condition which pauses, at the time of completion of a predetermined step, the diagnosing program under performance in the inspection mode, wherein said pausing condition is indicated in said indicating means when the diagnosing program is performed in the inspection mode.

3. A vehicle diagnosing apparatus according to claim 2, further comprising processing time setting means for setting the processing time required to perform each of the steps which constitute the diagnosing program, and computing means which computes the diagnosing time required for performing the diagnosing program in the diagnosing mode, said computing being made by summing the processing time in each of the steps performed when the diagnosing program is performed in the inspection mode.

4. A vehicle diagnosing apparatus according to claim 1, further comprising processing time setting means for setting the processing time required to perform each of the steps which constitute the diagnosing program, and computing means which computes the diagnosing time required for performing the diagnosing program in the diagnosing mode, said computing being made by summing the processing time in each of the steps performed when the diagnosing program is performed in the inspection mode.

* * * * *